(12) United States Patent
Klostermeier et al.

(10) Patent No.: US 7,866,566 B2
(45) Date of Patent: Jan. 11, 2011

(54) METHOD FOR OPERATING A TACHOGRAPH AND TACHOGRAPH FOR CARRYING OUT THE METHOD

(75) Inventors: Dieter Klostermeier, Villingen-Schwenningen (DE); Horst Näther, Villingen-Schwenningen (DE); Thomas Riester, Villingen-Schwenningen (DE); Peter Wolf, Niedereschach (DE)

(73) Assignee: Continental Automotive GmbH, Hannover (DE)

( * ) Notice: Subject to any disclaimer, the term of this patent is extended or adjusted under 35 U.S.C. 154(b) by 47 days.

(21) Appl. No.: 12/095,449

(22) PCT Filed: Jan. 18, 2007

(86) PCT No.: PCT/EP2007/050468

§ 371 (c)(1),
(2), (4) Date: Sep. 11, 2008

(87) PCT Pub. No.: WO2007/090722

PCT Pub. Date: Aug. 16, 2007

(65) Prior Publication Data

US 2009/0013120 A1  Jan. 8, 2009

(30) Foreign Application Priority Data

Feb. 10, 2006  (DE) .................... 10 2006 006 453

(51) Int. Cl.
| | |
|---|---|
| G06F 17/00 | (2006.01) |
| G06F 7/00 | (2006.01) |
| G06K 7/00 | (2006.01) |
| G06K 19/00 | (2006.01) |
| G06K 19/02 | (2006.01) |
| G06K 21/00 | (2006.01) |
| G06K 19/06 | (2006.01) |
| B60Q 1/00 | (2006.01) |
| G07C 3/00 | (2006.01) |
| G01F 15/06 | (2006.01) |
| G04F 10/04 | (2006.01) |

(52) U.S. Cl. ................ 235/492; 235/375; 235/436; 235/486; 235/487; 340/438; 340/439; 346/33 R; 377/15; 377/16; 377/19; 377/20; 377/24.1

(58) Field of Classification Search ......... 235/486–492, 235/375, 436; 340/438, 439; 346/33 R; 377/15–16, 19–20, 24.1

See application file for complete search history.

(56) References Cited

U.S. PATENT DOCUMENTS

| | | | | |
|---|---|---|---|---|
| 4,404,464 A | * | 9/1983 | Moreno | 235/438 |
| 2005/0052478 A1 | * | 3/2005 | Benzing et al. | 346/50 |
| 2006/0283955 A1 | | 12/2006 | Riester et al. | 235/475 |

FOREIGN PATENT DOCUMENTS

| | | |
|---|---|---|
| DE | 2954742 | 1/1979 |
| DE | 10024828 | 5/2000 |
| DE | 10321231 | 5/2004 |
| EP | 0490860 | 12/1991 |
| GB | 2036435 | 1/1979 |
| GB | 2352319 | 5/2000 |
| WO | 02/073543 | 9/2002 |

OTHER PUBLICATIONS

International Search Report; PCT/EP2007/050468; pp. 4, Apr. 27, 2007.

* cited by examiner

*Primary Examiner*—Michael G Lee
*Assistant Examiner*—Laura Gudorf
(74) *Attorney, Agent, or Firm*—King & Spalding L.L.P.

(57) ABSTRACT

In a method for transferring data from a tachograph (1) onto a smartcard (3), the smartcard (3) is moved out of and back into the tachograph (1) by an electromotive drive (8) as a function of stipulated conditions. In the process, spring contacts (6) of the tachograph (1) rub over contact areas (5) of the smartcard (3) and remove any dirt which may be present. The conditions for starting the electromotive drive (8) and the intended operation of the electromotive drive (8) are stored in a memory (10) of an electronic control device (9).

16 Claims, 2 Drawing Sheets

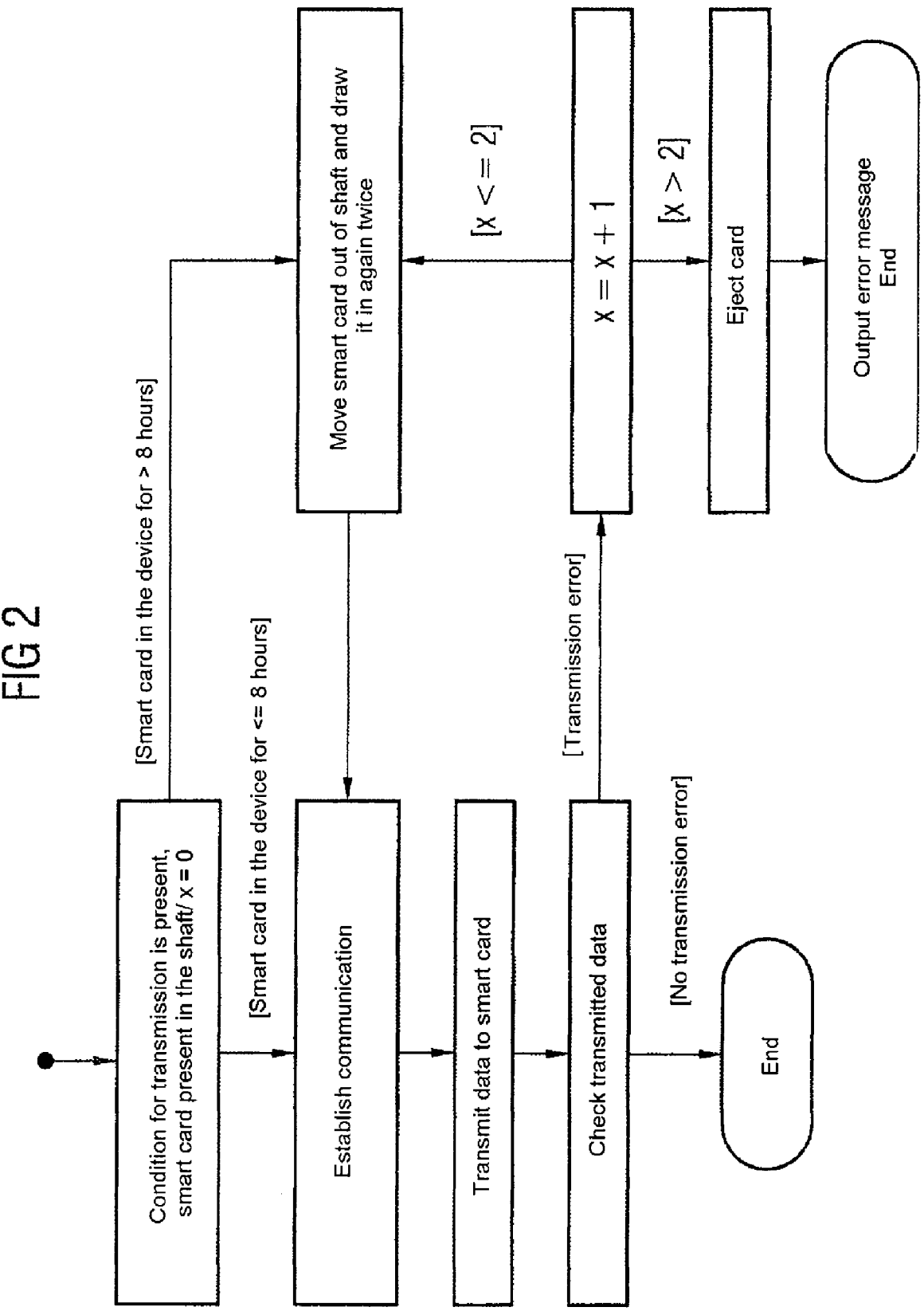

METHOD FOR OPERATING A TACHOGRAPH AND TACHOGRAPH FOR CARRYING OUT THE METHOD

CROSS-REFERENCE TO RELATED APPLICATIONS

This application is a U.S. national stage application of International Application No. PCT/EP2007/050468 filed Jan. 18, 2007, which designates the United States of America, and claims priority to German application number 10 2006 006 453.4 filed Feb. 10, 2006, the contents of which are hereby incorporated by reference in their entirety.

TECHNICAL FIELD

The invention relates to a method for operating a tachograph, in which, following insertion of a smart card into a shaft, communication is first established between the smart card, which is inserted in the shaft, and the tachograph, and data is then transmitted to the smart card. The invention also relates to a tachograph for carrying out the method, comprising an electronic device for collecting and evaluating data, comprising a shaft for accommodating a smart card, and comprising spring contacts for making contact between contact areas of the smart card and the electronic device.

BACKGROUND

Tachographs for motor vehicles, in particular for heavy goods vehicles, detect and evaluate data relating to a journey and to a driver of the motor vehicle and are known in practice. The smart card is used, inter alia, to store the data relating to the driver, which data is generated in the tachograph, and has a chip with contact areas with which spring contacts, which are arranged in the shaft, make contact. A problem can arise when transmitting data to the smart card if the spring contacts or the contact areas are dirty or corroded. In this case, the data can no longer be transmitted from the tachograph to the smart card and, in the worst-case scenario, a relatively large amount of data is lost. Equally, when the card has already been inserted in the shaft for a relatively long time, the connection between the spring contacts and the contact areas can be impaired due to temperature and moisture influences.

SUMMARY

Reliable communication between the tachograph and the smart card can be established according to an embodiment, by a method for operating a tachograph, comprising the steps of following insertion of a smart card into a shaft, first establishing communication between the smart card, which is inserted in the shaft, and the tachograph, and then transmitting data to the smart card, wherein the transmission of data is monitored and, when a fault is identified in the transmission of data, the smart card is moved a short way out of the shaft and drawn in again, and wherein communication between the smart card, which is inserted in the shaft, and the tachograph is then established again.

According to a further embodiment, the movement of the smart card out of the shaft and back into the shaft may be executed twice immediately in succession. According to a further embodiment, the smart card may be moved a short way out of the shaft and drawn in again after a stipulated period of time, for which the smart card is inserted in the shaft, before communication is generated between the smart card and the tachograph. According to a further embodiment, the smart card may be ejected from the shaft after a stipulated number of futile attempts at establishing communication between the smart card and the device and subsequent movement of the card. According to a further embodiment, the number of attempts at establishing communication and subsequent movement of the smart card may be two.

According to another embodiment, a tachograph may comprise an electronic device for collecting and evaluating data, comprising a shaft for accommodating a smart card, and comprising spring contacts for making contact between contact areas of the smart card and the electronic device, wherein the shaft has an electromotive drive for the smart card and a control device for the electromotive drive, and wherein the control device has a memory for storing conditions and a number of stipulated movements of the smart card.

BRIEF DESCRIPTION OF THE DRAWINGS

The invention permits numerous embodiments. In order to further explain its basic principle, one of said embodiments will be explained in greater detail below and is illustrated in the drawing, in which FIG. 1 schematically shows a tachograph containing a smart card, and FIG. 2 shows a flowchart of the method according to an embodiment for transmitting data to the smart card from FIG. 1.

DETAILED DESCRIPTION

Figure 1:
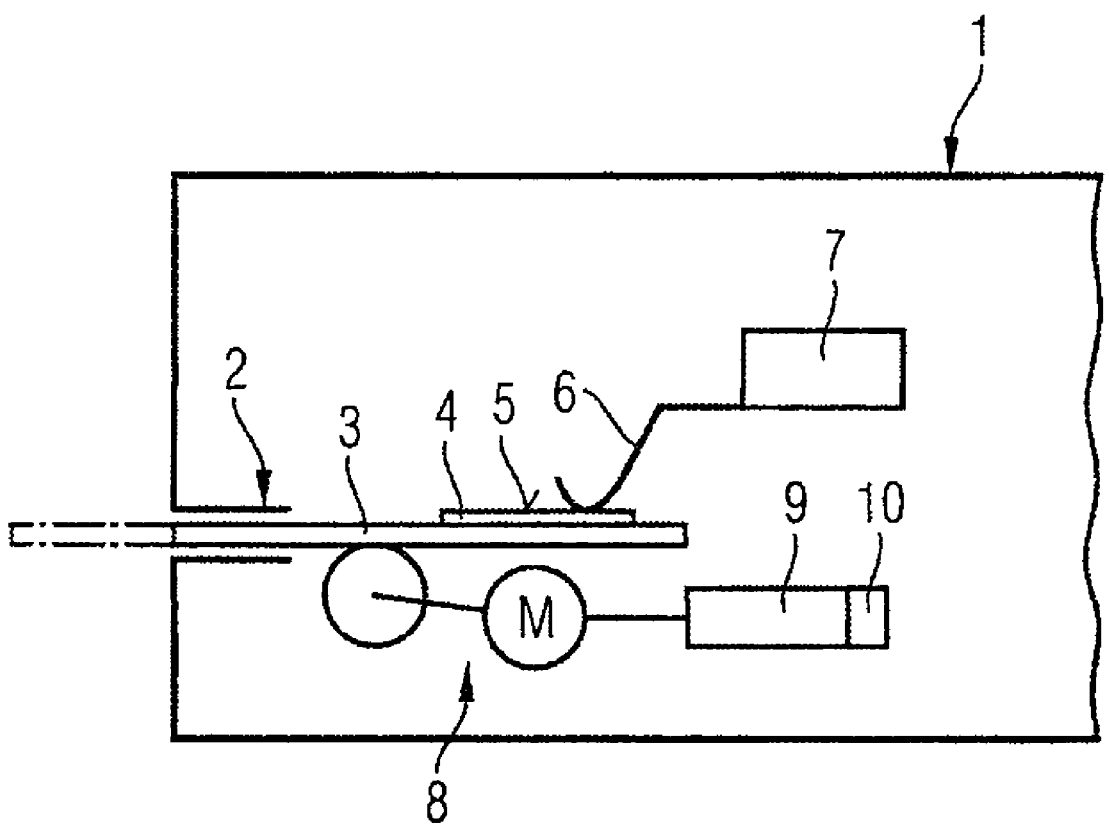

According to an embodiment, the transmission of data is monitored and, when a fault is identified in the transmission of data, the smart card is moved a short way out of the shaft and drawn in again, and in that communication between the smart card, which is inserted in the shaft, and the tachograph is then established again.

On account of this configuration, the spring contacts of the tachograph rub across the contact areas and remove any dirt from the smart card. Since the transmission of data is monitored, errors can be immediately detected and eliminated by retransmitting the data. Transmission of the data is preferably monitored by the data which is contained in the device and transmitted to the smart card being read out again immediately after transmission and being compared with the data contained in the device. By virtue of the method according to an embodiment, the tachograph itself ensures that the data is reliably transmitted to the smart card and, in the event of there being errors in the transmission of data, automatically eliminates a possible source of the errors.

When the smart card is very dirty, the method according to an embodiment permits a particularly rapid transmission of data if the movement of the smart card out of the shaft and back into the shaft is executed twice immediately in succession. If the contact areas of the smart card are not sufficiently cleaned by a single movement, the double movement according to an embodiment is faster than when an attempt is made to establish communication after the first movement of the smart card.

In many cases, the data is transmitted from the tachograph to the smart card at intervals, for example every 12 hours. According to another embodiment, soiling of the spring contacts or the contact areas between the intervals can be easily eliminated if the smart card is moved a short way out of the shaft and drawn in again after a stipulated period of time, for which the smart card is inserted in the shaft, before communication is generated between the smart card and the tachograph.

According to another embodiment, continual movement of the smart card, with which communication cannot be established, can be easily avoided if the smart card is ejected from the shaft after a stipulated number of futile attempts at establishing communication between the smart card and the device and subsequent movement of the card.

The method according to an embodiment permits adequate cleaning of smart cards which are soiled to a customary degree if the number of attempts at establishing communication and subsequent movement of the smart card is two.

A tachograph of the type mentioned above in the introduction can be provided for carrying out the method and may comprise an electronic device for collecting and evaluating data, comprising a shaft for accommodating a smart card, and comprising spring contacts for making contact between contact areas of the smart card and the electronic device, is solved, according to an embodiment, in that the shaft has an electromotive drive for the smart card and a control device for the electromotive drive, and in that the control device has a memory for the conditions and the number of stipulated movements of the smart card.

On account of this configuration, the tachograph has all the components with which the smart card is drawn in and moved out again. The movement is controlled by the control device. The conditions for the method and the number of movements are stored in the memory. As a result, the tachograph is of particularly simple construction and permits particularly reliable transmission of the data.

FIG. 1 schematically shows a sectional illustration of a tachograph 1 comprising a shaft 2 for accommodating a smart card 3. The smart card 3 has a chip 4 with contact areas 5. Spring contacts 6 of the tachograph are prestressed against the contact areas 5. In order to simplify the drawing, only one of the spring contacts 6 is illustrated. The spring contacts 6 are connected to an electronic device 7 for collecting and evaluating data. The smart card 3 can be drawn into and moved out of the shaft 2 by an electromotive drive 8. In the drawing, dash-dotted lines illustrate the smart card 3 in a position in which it is moved a short way out of the shaft 2. The electromotive drive 8 is actuated by a control device 9. The control device 9 has a memory 10 for conditions and a number of stipulated movements of the smart card 3 by the electromotive drive 8.

FIG. 2 shows a flowchart for carrying out a method for transmitting data from the tachograph 1 to the smart card 3 from FIG. 1. The method is started by inserting the smart card 3 into the shaft 2 of the tachograph 1 and when conditions for data to be transmitted to the smart card 3 are present. At the same time, a counting mechanism is set to zero. The presence of conditions can be controlled, for example, by an interval, so that the data is transmitted from the tachograph 1 to the smart card 3 daily at a specific time of day, for example. If the smart card 3 is in the tachograph 1 for longer than a stipulated period of time of, for example, 8 hours, the smart card 3 is moved a short way out of the shaft 2 and drawn back in by actuating the electromotive drive 8. In the process, the spring contacts 6 rub across the contact areas 5 of the smart card 3 and wipe off any dirt which may be present. Then, or when the smart card 3 has been inserted into the shaft 2 just previously, communication between the electronic device and the chip 4 of the smart card 3 is established and the data is transmitted. The data is then read out again and compared with the data to be transmitted. A transmission error can be identified in the process. If no transmission error has been identified, the method is terminated. When there is an error in data transmission, the counting mechanism is incremented by a number. If the number is less than or equal to two, the smart card 3 is moved out of the shaft 2 and drawn back in again twice. Communication is then established again and data transmission is restarted. If, however, the number is greater than two, it follows that two attempts have already been made to clean the contact areas by movement of the smart card 3. In this case, the smart card 3 is ejected, together with an error message.

What is claimed is:

1. A method for operating a tachograph, comprising the steps of:

following insertion of a smart card into a shaft, establishing communication between the smart card, which is inserted in the shaft, and the tachograph, transmitting data from the tachograph to the smart card, reading out and comparing the transmitted data to data stored by the tachograph, identifying a fault in the transmission of the data based on the comparison of the transmitted data to data stored by the tachograph, and when a fault is identified in the transmission of data, the smart card is moved a short way out of the shaft and drawn in again, and wherein communication between the smart card, which is inserted in the shaft, and the tachograph is then established again.

2. The method according to claim 1, wherein the movement of the smart card out of the shaft and back into the shaft is executed twice immediately in succession.

3. The method according to claim 1, wherein the smart card is moved a short way out of the shaft and drawn in again after a stipulated period of time, for which the smart card is inserted in the shaft, before communication is generated between the smart card and the tachograph.

4. The method according to claim 1, wherein the smart card is ejected from the shaft after a stipulated number of futile attempts at establishing communication between the smart card and the device and subsequent movement of the card.

5. The method according to claim 1, wherein the number of attempts at establishing communication and subsequent movement of the smart card is two.

6. A tachograph, comprising an electronic device for collecting and evaluating data, comprising a shaft for accommodating a smart card, and comprising spring contacts for making contact between contact areas of the smart card and the electronic device, wherein the shaft has an electromotive drive for the smart card and a control device for the electromotive drive, and wherein the control device has a memory for storing conditions and a number of stipulated movements of the smart card resulting only from fault detection.

7. The tachograph according to claim 6, further being operable to establishing communication between the smart card, which is inserted in the shaft, and the tachograph, and to transmit data to the smart card, wherein the transmission of data is monitored and, when a fault is identified in the transmission of data, the smart card is moved a short way out of the shaft and drawn in again, and wherein communication between the smart card, which is inserted in the shaft, and the tachograph is then established again.

8. The tachograph according to claim 7, wherein the tachograph is further operable to execute the movement of the smart card out of the shaft and back into the shaft twice immediately in succession.

9. The tachograph according to claim 7, wherein the tachograph is further operable to move the smart card a short way out of the shaft and draw the smart card in again after a stipulated period of time, for which the smart card is inserted in the shaft, before communication is generated between the smart card and the tachograph.

10. The tachograph according to claim 7, wherein the tachograph is further operable to eject the smart card from the shaft after a stipulated number of futile attempts at establishing communication between the smart card and the device and subsequent movement of the card.

11. The tachograph according to claim 7, wherein the number of attempts at establishing communication and subsequent movement of the smart card is two.

12. A method for operating a tachograph, comprising the steps of:
 inserting a smart card into a shaft of said tachograph,
 establishing communication between the smart card and the tachograph, and
 transmitting data from the tachograph to the smart card,
 reading out and comparing the transmitted data to data stored by the tachograph,
 identifying a fault in the transmission of the data based on the comparison of the transmitted data to data stored by the tachograph, and
 when a fault is identified in the transmission of data, moving the smart card a short way out of the shaft and drawn in again followed by a repeated communication between the smart card the tachograph.

13. The method according to claim 12, wherein the movement of the smart card out of the shaft and back into the shaft is executed twice immediately in succession.

14. The method according to claim 12, wherein the smart card is moved a short way out of the shaft and drawn in again after a stipulated period of time, for which the smart card is inserted in the shaft, before communication is generated between the smart card and the tachograph.

15. The method according to claim 12, wherein the smart card is ejected from the shaft after a stipulated number of futile attempts at establishing communication between the smart card and the device and subsequent movement of the card.

16. The method according to claim 12, wherein the number of attempts at establishing communication and subsequent movement of the smart card is two.

* * * * *